(12) United States Patent
Link et al.

(10) Patent No.: US 8,733,293 B2
(45) Date of Patent: May 27, 2014

(54) PET ENCLOSURE WITH DUAL AXES SWIVEL CONNECTOR

(75) Inventors: David Link, Costa Mesa, CA (US); Hongkun Liang, Zhongshan (CN)

(73) Assignee: Precision Pet Products, Inc., Costa Mesa, CA (US)

( * ) Notice: Subject to any disclaimer, the term of this patent is extended or adjusted under 35 U.S.C. 154(b) by 0 days.

(21) Appl. No.: 13/283,768

(22) Filed: Oct. 28, 2011

(65) Prior Publication Data

US 2012/0272920 A1    Nov. 1, 2012

Related U.S. Application Data

(63) Continuation-in-part of application No. 13/045,411, filed on Mar. 10, 2011.

(51) Int. Cl.
*A01K 31/06* (2006.01)

(52) U.S. Cl.
USPC ................................ 119/474; 24/336; 24/339

(58) Field of Classification Search
USPC ................. 119/416, 452, 453, 472, 473, 474; 24/335, 336, 39, 339; 403/389, 391, 403/396, 397
See application file for complete search history.

(56) References Cited

U.S. PATENT DOCUMENTS

| | | | | |
|---|---|---|---|---|
| 2,796,648 A | * | 6/1957 | Peterson | 403/311 |
| 2,942,314 A | * | 6/1960 | Debner et al. | 403/391 |
| 3,516,043 A | * | 6/1970 | Spofford | 439/287 |
| 3,526,934 A | * | 9/1970 | Owen, Sr. | 285/154.1 |
| 3,894,706 A | * | 7/1975 | Mizusawa | 248/68.1 |
| 3,896,766 A | | 7/1975 | Martin | |
| 4,016,833 A | | 4/1977 | Ray | |
| 4,140,080 A | | 2/1979 | Snader | |
| 4,148,113 A | * | 4/1979 | Dvorachek | 24/16 R |
| 4,527,512 A | | 7/1985 | Sugiura | |
| 4,590,885 A | | 5/1986 | Sugiura | |
| 4,762,085 A | | 8/1988 | Ondrasik | |
| 4,763,606 A | | 8/1988 | Ondrasik | |

(Continued)

FOREIGN PATENT DOCUMENTS

CN    201123292    10/2008

OTHER PUBLICATIONS www.packagingandfastening.com, "Hartco Clinch Clips", 5 pgs.

(Continued)

*Primary Examiner* — David Parsley
*Assistant Examiner* — Thien Thanh Pham
(74) *Attorney, Agent, or Firm* — Stetina Brunda Garred & Brucker

(57) ABSTRACT

A dual axes swivel connector for connecting various panels to assemble a pet enclosure is disclosed. The dual axes swivel connector allows panels of the enclosure to be reliably pivoted with respect to each other. The dual axes swivel connector may comprise first and second parts. The first part may be fabricated from a flexible material compared to the second part, whereas the second part may be fabricated from a more rigid material compared to the first part. The flexibility of the first part allows the first part to have a tighter fit with the wire rods. The second part has a looser fit with the wire rods but the rigidity of the second part compensates for the looser fit. When the first and second parts are interlocked, they create a tight fit which can reliably provide a hinge between the panels.

5 Claims, 15 Drawing Sheets

(56) References Cited

U.S. PATENT DOCUMENTS

| | | | |
|---|---|---|---|
| 4,769,876 A * | 9/1988 | Platt .................................. | 24/459 |
| 4,917,047 A | 4/1990 | Wazeter, III | |
| 5,058,863 A * | 10/1991 | Maffet ............................. | 256/26 |
| 5,097,796 A | 3/1992 | Reimers | |
| 5,233,939 A | 8/1993 | Randolph | |
| 5,331,725 A * | 7/1994 | Chou ................................ | 24/545 |
| 5,335,618 A | 8/1994 | Zarola | |
| 5,482,005 A | 1/1996 | Thom | |
| 5,544,619 A * | 8/1996 | Braun ............................ | 119/474 |
| 5,549,073 A | 8/1996 | Askins et al. | |
| 5,626,098 A | 5/1997 | Askins et al. | |
| 5,653,194 A | 8/1997 | Guy | |
| 5,752,470 A | 5/1998 | Koneke | |
| 5,950,568 A | 9/1999 | Axelrod et al. | |
| 5,967,089 A | 10/1999 | Allen | |
| 6,012,940 A * | 1/2000 | Wheeler ........................ | 439/369 |
| 6,092,488 A | 7/2000 | Allawas | |
| 6,152,081 A | 11/2000 | Baker | |
| 6,155,206 A | 12/2000 | Godshaw | |
| 6,192,834 B1 | 2/2001 | Kolozsvari | |
| 6,405,414 B1 * | 6/2002 | Byrnes et al. ................... | 24/339 |
| 6,621,590 B1 | 9/2003 | Livingston | |
| 6,681,720 B1 | 1/2004 | Skurdalsvold et al. | |
| 6,883,463 B2 | 4/2005 | Link | |
| 7,316,506 B2 * | 1/2008 | Deonarine .................... | 374/208 |
| D631,740 S * | 2/2011 | Wood ............................. | D8/396 |
| 2003/0108385 A1 * | 6/2003 | Finco et al. .................... | 403/396 |

OTHER PUBLICATIONS www.raising-rabbits.com, "Rabbit Cage Plans: Build Your Own All-Wire Cages", 5 pgs.

www.efinch.com, "Building an All Wire Finch Cage", 4 pgs.

* cited by examiner

PET ENCLOSURE WITH DUAL AXES SWIVEL CONNECTOR

CROSS-REFERENCE TO RELATED APPLICATIONS

This is a continuation in part application of U.S. patent application Ser. No. 13/045,411, filed on Mar. 10, 2011, the entire contents of which are incorporated herein by reference.

STATEMENT RE: FEDERALLY SPONSORED RESEARCH/DEVELOPMENT

Not Applicable

BACKGROUND

The present invention relates to a collapsible enclosure (e.g., pet enclosure).

Pet or animal enclosures are commonly used to accommodate, confine or transport pets or animals. Currently, prior art pet enclosures are fabricated from a wire frame wherein the various panels are hinged to each other by way of Hartco clips. Hartco clips are wrapped around adjacent wires of adjacent panels so as to form a loop around the adjacent wires. The adjacent panels can pivot or rotate with respect to each other due to the space provided in the enclosed loop. Unfortunately, the wires of the adjacent panels may bind within the loop (i.e., Hartco clip) when being rotated with respect to each other. The wires contact each other within the Hartco clip and are inadvertently wedged between the wires and the loop. Accordingly, the Hartco clips provide space for the adjacent wires but do not ensure that the adjacent wires will not bind against each other. When the wires bind against each other in the Hartco clip, the adjacent panels cannot be stacked upon each other.

An additional problem with prior art pet enclosures is that they are noisy during transportation. By way of example and not limitation, as the pet enclosure is transported in a car over a road or in a train over railway, the Hartco clips vibrate against the wires of the panels of the enclosure and also allow adjacent wires to vibrate against each other. The vibration contact produces undesirable noise.

Accordingly, there is a need in the art for an improved animal or pet enclosure.

BRIEF SUMMARY

The pet enclosure disclosed herein addresses the needs discussed above, discussed below and those that are known in the art.

The pet enclosure may have left, right, front, back, top and bottom panels which are stackable upon each other to fold the enclosure to a collapsed position. The user may unfold the enclosure to the erected position. In doing so, the various panels are pivoted about each other by way of dual axes swivel connectors.

These dual axes swivel connectors may reduce noise as the pet enclosure is being transported in a car over a road. In particular, the panels may be fabricated from a metallic material whereas the swivel connectors may be fabricated from a plastic material. When the enclosure is traversed to the erected position, the various panels are generally supported between each other by the swivel connectors. The swivel connectors which may be fabricated from a plastic material behave as shock absorbers or vibration dampeners to reduce the overall noise caused by the rattling of the erected pet enclosure.

Additionally, when traversing the pet enclosure to the collapsed position, the panels which are typically fabricated from a metallic material generally do not bend. As such, the various panels must be offset at different height elevations as measured from the bottom panel when being stacked upon each other and on top of the bottom panel. If the adjacent panels are connected to each other through prior art Hartco clips, adjacent wires of the adjacent panels are looped together as discussed in the background section above. Unfortunately, the adjacent wires and the prior art Hartco clips may bind against each other preventing rotation of the adjacent panels and preventing the adjacent panels from being stacked upon each other at different heights. To this end, the dual axes swivel connector facilitates offsetting of the panels so that they may be stacked upon each other since the adjacent wires of adjacent panels do not bind within the dual axes swivel connector.

Moreover, the dual axes swivel connectors may be unidirectional. In particular, the dual axes swivel connector is mounted to edge rods of adjacent panels. Once the swivel connector is attached to adjacent edge rods of adjacent panels, it is not intended for the swivel connectors to be removed. To this end, the swivel connectors may have a tapered median that separates the adjacent edge rods from each other and pushes the respective edge rods deeper into grooves of the swivel connector to mitigate withdrawal of the edge rods out of the connectors once the edge rods are disposed in the grooves of the swivel connector. Moreover, retaining walls of the swivel connector may be sufficiently wrapped around the edge rods to mitigate pull out of the edge rods from the swivel connectors. Additionally, the tapered median prevents contact between adjacent edge rods of adjacent panels so that the edge rods do not bind or get stuck during pivoting of adjacent panels.

More particularly, a collapsible enclosure is disclosed. The enclosure may comprise a first top dual axes swivel connector, a second top dual axes swivel connector, a first bottom dual axes swivel connector and a second bottom dual axes swivel connector wherein each of the connectors may have two grooves defining pivot axes generally parallel to each other. The enclosure may further comprise a top panel having first and second side edge rods, a bottom panel disposed opposite to the top panel wherein the bottom panel may have first and second side edge rods, a first side panel and a second side panel.

The first side panel may define top and bottom edge rods. The top edge rod of the first side panel may be pivotally attached to the first side edge rod of the top panel with the first top dual axes swivel connector so that the first side panel and the top panel pivots about the two pivot axes of the first top dual axes swivel connector. The bottom edge rod of the first side panel may be pivotally attached to the first side edge rod of the bottom panel with the first bottom dual axes swivel connector so that the first side panel and the bottom panel pivots about the two pivot axes of the first bottom dual axes swivel connector.

The second side panel may define top and bottom edge rods. The top edge rod of the second side panel may be pivotally attached to the second side edge rod of the top panel with the second top dual axes swivel connector so that the second side panel and the top panel pivots about the two pivot axes of the second top dual axes swivel connector. The bottom edge rod of the second side panel may be pivotally attached to the second side edge rod of the bottom panel with the second bottom dual axes swivel connector so that the second side panel and the bottom panel pivots about the two pivot axes of the second bottom dual axes swivel connector.

The enclosure may be traversed to a folded configuration wherein the first and second top and bottoms swivel connectors pivot to allow the first and second side panels to be positioned at different elevations with respect to the bottom panel so that the first and second side panels and the top panel may be stacked upon each other.

The first side wall may be disposed between the second side wall and the bottom panel when the enclosure is in a folded configuration. Also, the top panel may be disposed between the first and second side walls when the enclosure is in the folded configuration.

The top edge rod of the first side panel and the first edge rod of the top panel may be disposed within the two grooves of the first top dual axes swivel connector. The bottom edge rod of the first side panel and the first edge rod of the bottom panel may be disposed within the two grooves of the first bottom dual axes swivel connector. The top edge rod of the second side panel and the second edge rod of the top panel may be disposed within the two grooves of the second top dual axes swivel connector. Also, the bottom edge rod of the second side panel and the second edge rod of the bottom panel may be disposed within the two grooves of the second bottom dual axes swivel connector.

The bottom edge rod of the first side panel may be at a higher elevation compared to the bottom edge rod of the second side panel when the enclosure is in a collapsed position and wherein the first and second side edge rods of the bottom panel are at the same elevation.

The first and second side panels and the top and bottom panels may be fabricated from a metallic material and the dual axes swivel connectors may be fabricated from a plastic material for mitigating noise.

Additionally, a unidirectional dual axes swivel connector for pivotally connecting adjacent first and second panels having edge rods is disclosed. The connector may comprise a first end portion having two grooves which are operative to each receive one of the edge rods. The first end portion may comprise a tapered median, a back wall, and retaining walls. The tapered median may urge the edge rods into the two grooves. The tapered median may define a proximal end portion and a distal end portion.

The back wall may be connected to the distal end portion of the tapered median. The back wall may extend laterally outward from the distal end portion of the tapered median to limit insertion of the edge rods into the two grooves.

The retaining walls may be connected to opposed distal end portions of the back wall. The retaining walls may be resilient so as to flex outward upon inserting the edge rods between distal end portions of the retaining walls and the proximal end portion of the tapered median to permit traversal of the edge rods into the two grooves and to flex inward around the edge rods thereafter. The resilient retaining walls may extend about 180 degrees from the opposed distal end portions of the back wall to mitigate removal of the edge rods from the two grooves after insertion. The distal end portions of the retaining walls and the distal end portion of the tapered median defines entrance gaps of the two grooves.

The connector may further comprise a second end portion which may have two grooves which are operative to each receive one of the edge rods. The second end portion may be oriented in reverse to the first end portion for engaging the two grooves of the first and second end portions by rotating the connector with respect to the edge rods.

The second end portion may comprise a tapered median, a back wall and retaining walls. The tapered median may urge the edge rods into the two grooves. The tapered median may define a proximal end portion and a distal end portion. The back wall may be connected to the distal end portion of the tapered median. The back wall may extend laterally outward from the distal end portion of the tapered median to limit insertion of the edge rods into the two grooves. The retaining walls may be connected to opposed distal end portions of the back wall. The retaining walls may be resilient to flex outward upon inserting the edge rods between distal end portions of the resilient retaining walls and the distal end portion of the tapered median to permit traversal of the edge rods into the two grooves and to flex inward around the edge rods thereafter. The resilient retaining walls may extend about 180 degrees from the opposed distal end portions of the back wall to mitigate removal of the edge rods from the two grooves after insertion. The distal end portions of the retaining walls and the distal end portion of the tapered median may define entrance openings of the two grooves.

A bridge may be attached to the tapered medians of the first and second end portions with the first and second end portions gapped apart from each other. The entrance openings of the two grooves of the first end portion may be oriented about-face with respect to the entrance openings of the two grooves of the second end portion. The retaining walls of the first and second end portions may have chamfered interior corners.

Moreover, a method of collapsing an enclosure is disclosed. The method may comprise the steps of stacking a left panel on a bottom panel and a top panel on a right panel; pivoting the stacked top panel and right panel on top of the stacked left panel and bottom panel; and rotating first and second dual axes swivel connector, the first dual axes swivel connector attached to the left panel and bottom panel, the second dual axes swivel connector attached to the right panel and the bottom panel so that a bottom edge rod of the left panel is at a lower elevation compared to a bottom edge rod of the right panel for permitting stacking of the left panel, right panel and top panel on top of the bottom panel.

In the method, the rotating step may comprise the steps of rotating the first dual axes swivel connector about a first side edge rod of the bottom panel in a direction opposite from a rotating direction of the second dual axes connector about a second side edge rod of the bottom panel for offsetting the left panel below the stacked top and right panels.

Moreover, a dual axes swivel connector for pivotally connecting adjacent first and second panels is disclosed. The first panel may have a first rod. The second panel may have a second rod. The connector may comprise a first part having first and second grooves wherein the first groove is operative to receive the first rod and the second groove is operative to receive the second rod. The first part comprises a tapered median and first and second retaining walls. The tapered median directs the first and second rods into the grooves and away from each other. The first and second retaining walls extend from the tapered median and wrap around the first and second rods defining the first and second grooves. The tapered median and the first retaining walls wrap around more than 180 degrees around the first rod after insertion of the first rod in to the first groove. The tapered median and the second retaining wall wrap around more than 180 degrees around the second rod to hold the first and second rods in the first and second grooves after insertion of the second rod into the second groove.

The connector may further comprise an extension that protrudes out from the tapered median parallel to longitudinal axes of the first and second grooves. The longitudinal axes of the first and second grooves may be parallel to each other. The connector may further comprise a second part having an identical structure compared to the first part wherein the first groove of the second part is operative to receive the first rod and the second groove of the second part is operative to receive the second rod. The extension of the first part may be disposed between a gap of the second part defined between first and second walls of the second part when an extension of the second part is disposed between a gap of the first part defined between first and second walls of the first part for interlocking the first and second parts.

The connector may further comprise a second part which is identical to the first part and can interlock with the first part.

The connector may further comprise an extension that protrudes out from the tapered median parallel to longitudinal axes of the first and second grooves. The extension may have a pawl. The longitudinal axes of the first and second grooves may be parallel to each other. The connector may further comprise a second part having a tapered median and first and second retaining walls. The tapered median may direct the first and second rods into the grooves and away from each other. The first and second retaining walls may extend from the tapered median and wrap around the first and second rods defining the first and second grooves. The tapered median and the first retaining wall wrap more than 180 degrees around the first rod and the tapered median after insertion of the first rod into the first groove to hold the first rod in the first groove after insertion of the first rod into the first groove. The tapered median and the second retaining wall wrap more than 180 degrees around the second rod to hold the second rod in the second groove after insertion of the second rod into the second groove.

The first groove of the second part is operative to receive the first rod. The second groove of the second part is operative to receive the second rod. The extension of the first part is disposable between a gap of the second part defined between first and second walls of the second part. The pawl of the first part may engage the first and second walls of the second part when the extension of the second part is disposed between a gap of the first part defined between first and second walls of the first part for interlocking the first and second parts.

The extension of the second part may have a pawl for engaging the first and second walls of the first part when the extension of the first part is disposed within the gap of the first part. The pawl of the extension of the first part and the pawl of the extension of the second part may extend from the distal end portions of the extensions of the first and second parts.

Longitudinal axes of the first and second grooves of the first part may be coaxial with longitudinal axes of the first and second grooves of the second part when the first and second parts are interlocked with each other.

First and second opposed interior surfaces of the tapered median may each have a semi-circular configuration.

The first and second distal ends of the first and second retaining walls may define the gap which is about equal to a diameter of the first rod. The first and second distal end portions of the first and second retaining walls of the first part may have a V shaped configuration for guiding the first rod between the gap. Also, the tapered median may have a V shaped configuration.

A width of the extension of the first part may be about equal to a gap of the second part. Additionally, a dual axes swivel connector for pivotally connecting adjacent first and second panels wherein the first panel has a first rod and the second panel has a second rod is disclosed. The connector comprises a first part and a second part.

The first part may have first and second grooves wherein the first groove is operative to receive the first rod and the second groove is operative to receive the second rod. The first part may also comprise a median and first and second retaining walls. The median may direct the first and second rods into the grooves of the first part and away from each other. The first and second retaining walls may extend from the tapered median and wrap around the first and second rods defining the first and second grooves of the first part.

The second part may have first and second grooves wherein the first groove is operative to receive the first rod and the second groove is operative to receive the second rod. The second part may also comprise a median and first and second retaining walls. The median may direct the first and second rods into the grooves of the second part and away from each other. The first and second retaining walls may extend from the tapered median and wrap around the first and second rods defining the first and second grooves of the second part.

The first part may be fabricated from a more rigid material compared to the second part and may have a looser fit with the wire rods compared to the second part.

The median of the first part may be narrower compared to the median of the second part.

The distal ends of the retaining walls of the first part may define an entry of the first part and distal ends of the retaining walls of the second part define an entry of the second part. The entry of the first part may be wider compared to the entry of the second part.

The first and second parts may each further comprise an extension that protrudes out from the median parallel to longitudinal axes of the first and second grooves. The longitudinal axes of the first and second grooves may be parallel to each other. The extension of the first part may be disposed between the distal ends of the first and second retaining walls of the second part. Likewise, the extension of the second part may be disposed between the distal ends of the first and second retaining walls of the first part for interlocking the first and second parts.

The extensions of the first part may have a pawl that engages the second part to interlock the first and second parts. The extension of the second part may have a pawl that engages the first part to interlock the first and second parts. The pawl of the extension of the first part and the pawl of the extension of the second part may extend from the distal ends of the extensions of the first and second parts.

The longitudinal axes of the first and second grooves of the first part may be coaxial with longitudinal axes of the first and second grooves of the second part when the first and second parts are interlocked with each other.

The distal end portions of the first and second retaining walls of the first part and second part have a V shaped configuration for guiding the wire rod into the entry.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 2:
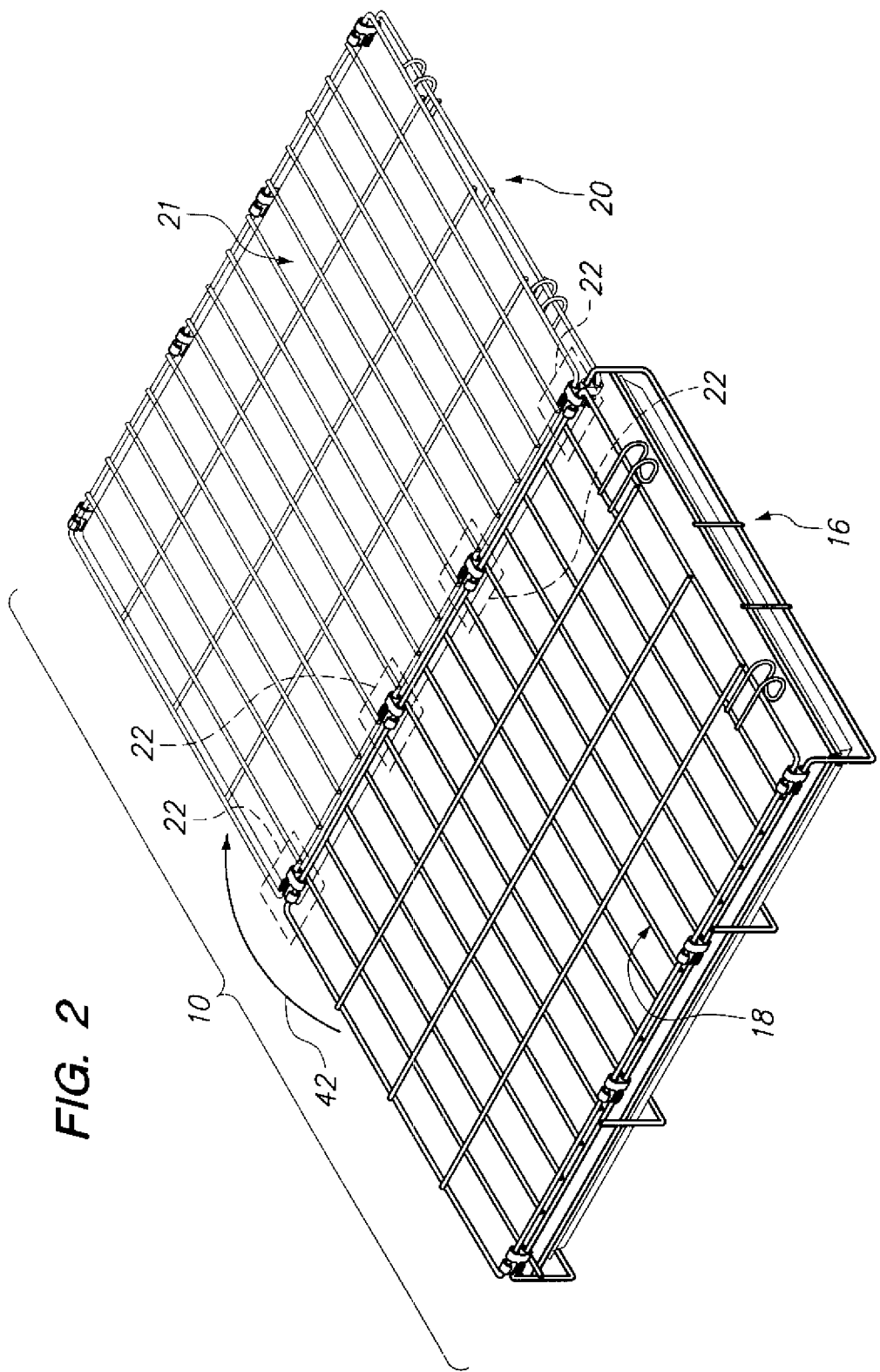
FIG. 2 is a perspective view of the enclosure shown in FIG. 1 being erected.
Figure 3:
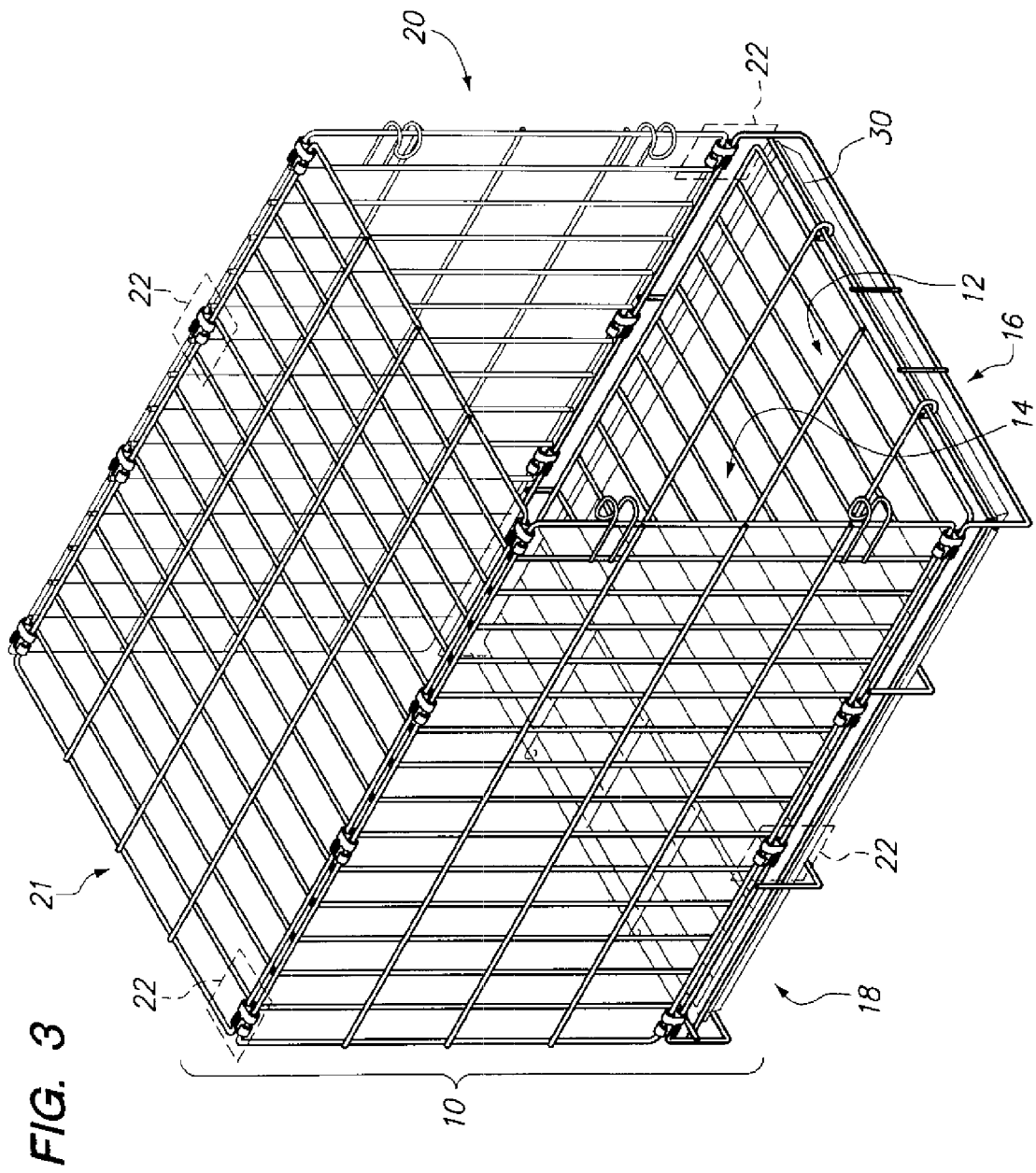
FIG. 3 is a perspective view of the enclosure shown in FIG. 2 being further erected.

Referring now to the drawings, a collapsible enclosure 10 is shown. When the enclosure 10 is in storage or being transported, the enclosure 10 may be traversed to the collapsed position shown in FIG. 1. During use, the enclosure 10 may be traversed to the erected position shown in FIG. 3. FIG. 3 illustrates the erected position of the enclosure 10 with front and back panels 12, 14 still in the folded configuration. The various panels, namely, a bottom panel 16, left and right side panels 18, 20 and top panel 21 may be rotatably connected to each other by way of a dual axes swivel connector 22, 100. A first embodiment of the dual axes swivel connector 22 is shown and described in relation to FIGS. 1-12. A second embodiment of the dual axes swivel connector 100 is shown and described in relation to FIGS. 13-17. It is also contemplated that the front and back panels 12, 14 may be rotatably connected to the bottom panel 16 by way of the dual axes swivel connector 22, 100.

Figure 8:
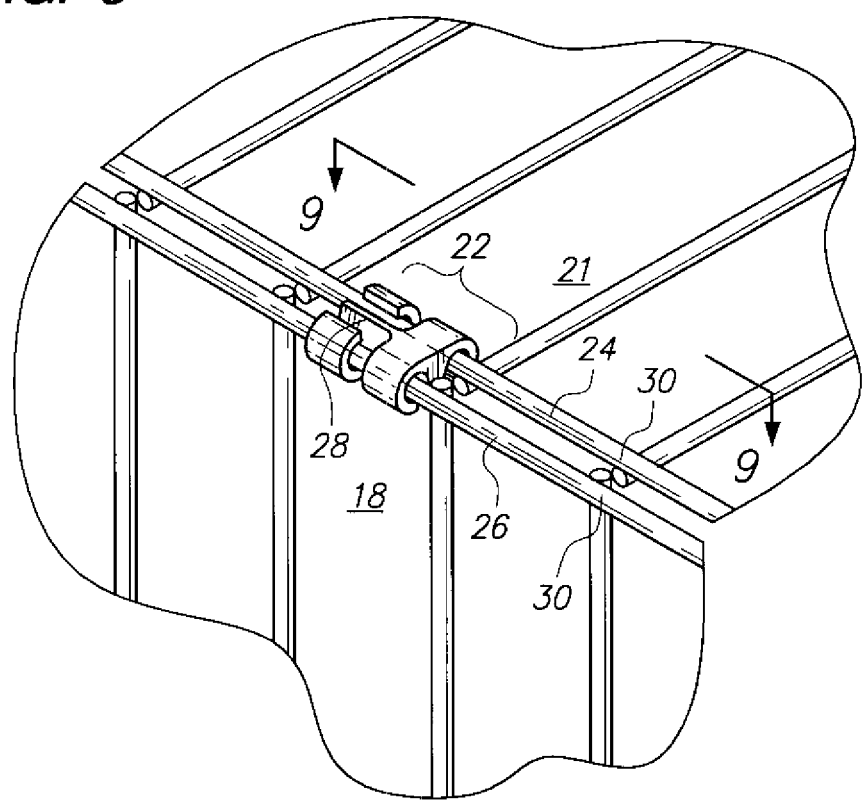
FIG. 8 illustrates the connector shown in FIG. 7 mounted to the edge rods of adjacent panels.
Figure 10:
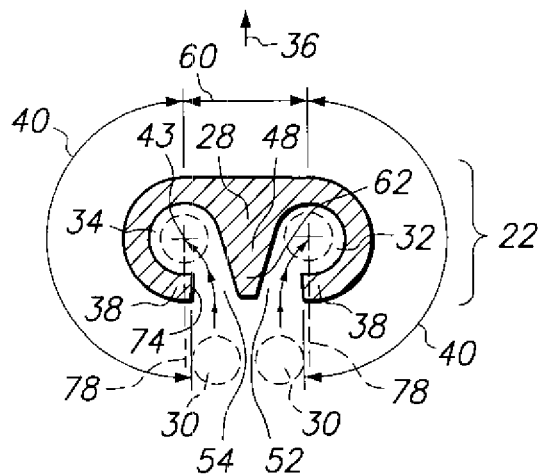
FIG. 10 is a cross sectional view of the connector shown in FIG. 9.

Referring now to FIG. 8, the dual axes swivel connector 22 has a first pivot axis 24 and a second pivot axis 26. The first and second pivot axes 24, 26 are separated by a median 28. In this manner, adjacent edge rods 30 of adjacent panels 21, 18, for example, generally do not contact each other as the adjacent panels 21, 18 are rotated about each other. The swivel connectors 22 may be attached to adjacent edge rods 30 of any two adjacent panels 12-21. Since the edge rods 30 are separated by the median 28, the enclosure 10 does not bind as the enclosure 10 is being traversed from the collapsed position to the erected position, and vice versa. Moreover, the swivel connectors 22 may be fabricated from a plastic material whereas the various panels 12, 14, 16, 18, 20 and 21 may be fabricated from a metallic material. In this manner, the plastic swivel connector 22 may behave as a shock absorber reducing noise when the enclosure 10 is being transported in cars, trains, etc. (i.e., vibration induced environments). Additionally, the swivel connector 22 may be sufficiently wrapped around the edge rods 30 so as to mitigate pull out of the edge rods 30 from the connectors 22. Moreover, the median 28 of the swivel connector 22 may be tapered so that the edge rod 30 is pushed into groove 32, 34 and is pushed sideways and is seated deep within the groove 32, 34 as shown in FIG. 10. When attempting to remove the edge rods 30 from the connector 22, the swivel connector 22 may be pivoted or pushed in direction of arrow 36. When the swivel connector 22 is pushed in the direction of arrow 36, the edge rods 30 contact distal end portions 38 of retaining walls 40 of the swivel connector 22 to increase pull out force required to pull rods 30 out of grooves 32, 34 of connector 22. The tapered median 28 pushed the edge rods 30 deeper into the grooves 32, 34 so that the distal end portions 38 of the retaining walls 40 may be positioned at a center of the edge rods 30 to prevent or mitigate withdrawal of the edge rods 30 from the swivel connector 22. Accordingly, the swivel connector 22 may be a unidirectional connector 22.

Figure 1:
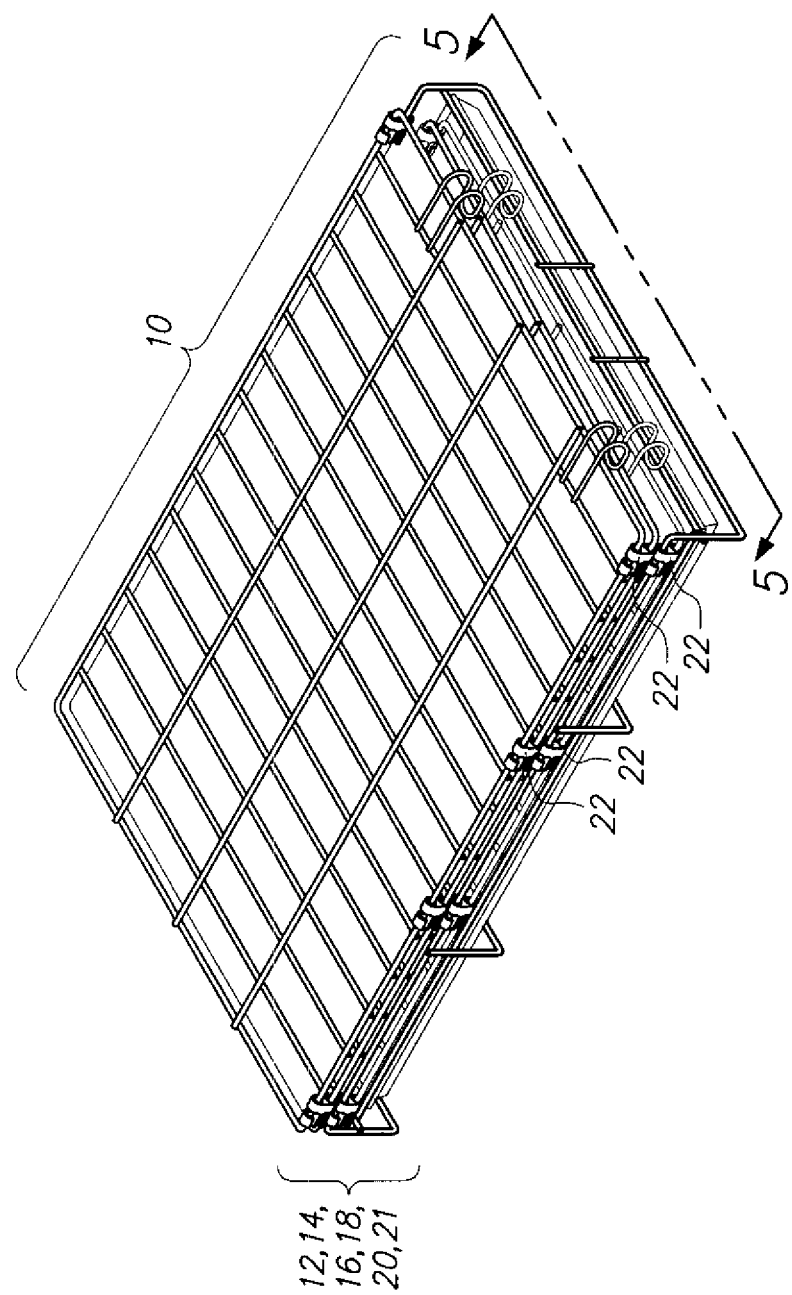
FIG. 1 is a perspective view of an enclosure in a collapsed position.

Referring now back to FIG. 1, the enclosure 10 may be transported in a collapsed position. In the collapsed position, the front panel 12, back panel 14, left side panel 18, right side panel 20 and the top panel 21 are all stacked upon the bottom panel 16 in a compact configuration. The collapsed enclosure 10 may be packaged and sold to customers who can then later erect the enclosure 10 for use. To erect the enclosure 10, the right side panel 20 and the top panel 21 may be pivoted outward in direction of arrow 42, as shown in FIG. 2. After the top panel 21 and the right side panel 20 are folded over in direction of arrow 42 (see FIG. 2), the top panel 21 may be raised up so as to traverse the enclosure 10 into the configuration shown in FIG. 3. The left and right side panels 18, 20 are disposed generally perpendicular with the bottom panel 16 and the top panel 21. Swivel connectors 22 are used to attach the top panel 21 to the left side panel 18, the left side panel 18 to the bottom panel 16, the bottom panel 16 to the right side panel 20 and the right side panel 20 to the top panel 21.

Figure 4:
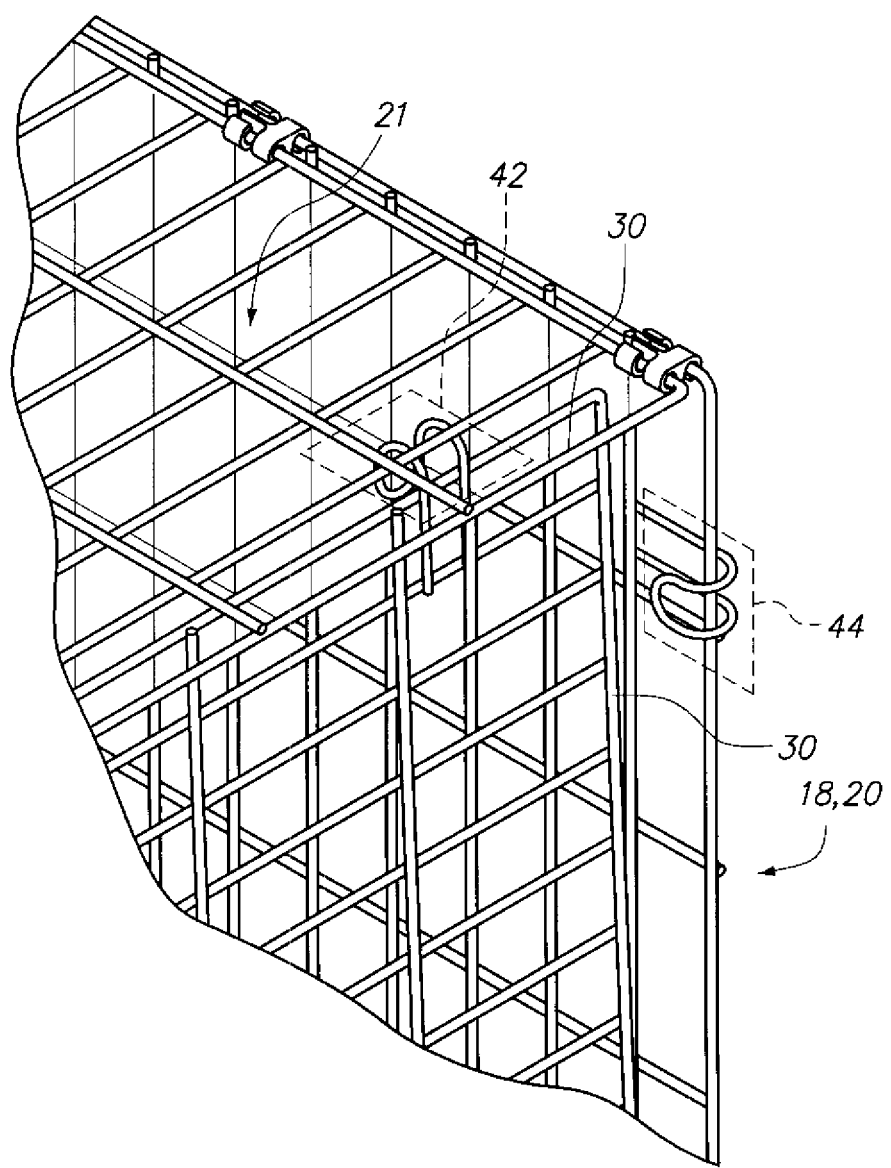
FIG. 4 illustrates attaching a front panel of the enclosure to left and right side panels and the top panel of the enclosure to complete erection of the enclosure.

The front and back panels 12, 14 may be raised up and interlocked to the left and right side panels 18, 20 and the top panel 21, as shown in FIG. 4. The wire frame of the front and back panels 12, 14 may be wrapped around an edge rod 30 of the bottom panel 16 as shown in FIG. 3. Moreover, it is also contemplated that the front and back panels 12, 14 may be rotatably connected to the edge rod 30 of the bottom panel 16 by way of the dual axes swivel connector 22. The front and back panels 12, 14 may have hooks 42, as shown in FIG. 4. Additionally, the left and right side panels 18, 20 may have hooks 44. Edge rods 30 of the front and back panels 12, 14 may initially be received into the hooks 44. The hooks 42 of the front and back panels 12, 14 are pulled beyond the edge rods 30 of the top panel 21 and the hooks 42 are hooked onto the edge rods 30 of the top panel 21.

To traverse the enclosure 10 to the collapsed position, the steps are reversed. In particular, the front and back panels 12, 14 are collapsed back onto the bottom panel 16 as shown in FIG. 3. The left side panel 18 is folded onto the stacked front panel 12, back panel 14 and bottom panel 16 while the top panel 21 is stacked upon the right side panel 20. In rotating the various panels 12, 14, 16, 18, 20 and 21 about each other, the edge rods 30 of each of the panels 12-21 swivel within the dual axes swivel connectors 22. The edge rods 30 of the panels 12-21 generally do not contact each other because the median 28 of the connectors 22 are disposed between the edge rods 30 of the adjacent panels 12-21. Accordingly, during movement and folding of the various panels 12-21 to traverse the enclosure 10 from the collapsed position to the erected position and vice versa, the edge rods 30 do not bind against each other.

The stacked top panel 21 and right side panel 20 are then folded over onto the left side panel 18. The swivel connectors 22 prevent any kinking of the enclosure 10.

Figure 5:
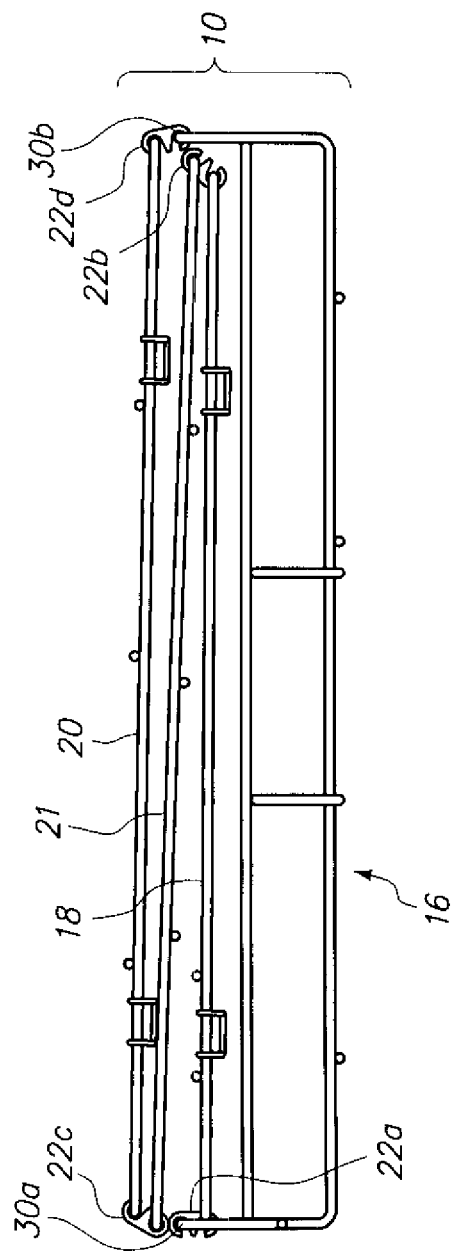
FIG. 5 is a front view of the collapsed enclosure shown in FIG. 1.

The panels 12-21 may be fabricated from a metallic material such as steel, aluminum, etc. Accordingly, the panels 12-21 may have a matrix of vertical and horizontal wires/rods so that the panels 12-21 are generally rigid. The panels 12-21 may flex slightly for the purposes of erecting the front and back panels 12, 14; however, the panels 12-21 are generally rigid. To this extent, the stacking of the various panels 12-21 on top of each other as shown in FIG. 1 may be accomplished by offsetting the various panels 12-21 with the aid of the dual axes swivel connectors 22. The dual axes swivel connectors 22 provides a definite or guaranteed separation between adjacent wires of adjacent panels 12-21 so that the adjacent wires and the dual axes swivel connectors 22 cannot be wedged against each other preventing rotation of the adjacent panels and stacking of the panels as in the prior art Hartco clips. Referring now to FIG. 5, a front view of the collapsed enclosure 10 is shown. As can be seen, the bottom panel 16 may generally have a U-shaped configuration which extends from edge rod 30a to edge rod 30b. The left side panel 18 is offset downward by pivoting the dual axes swivel connector 22a to the down position. The left side panel 18 may rest on top of the bottom panel 16. The top panel 21 is now stacked upon the left side panel 18. To this end, the swivel connector 22b is pivoted upward to offset the top panel 21 above the left side panel 18. The right side panel 20 may be offset on top of the top panel 21 by way of swivel connector 22c. Swivel connector 22d raises the right side panel 20 above the top panel 21 and left side panel 18. In this manner, edge rods 30a, b of the bottom panel 16 may be at the same height elevation yet allow stacking of the panels 18, 20 and 21 upon each other since the dual axes swivel connectors 22a-d allow the various panels 18, 20, 21 to be offset. During manufacture and assembly of the enclosure 10, no special instructions are necessary thereby reducing assembly cost when assembling the left and right side panels 18, 20 to the bottom panel 16 since they may be mirror configurations of each other.

Although the edge rods 30a, b have mirror configurations, it is also contemplated that either one of the edge rods 30a or 30b may be disposed at a higher elevation to the other to allow for additional offset space so that the various panels 18, 20, 21 may be stacked upon the bottom panel 16.

Figure 6:
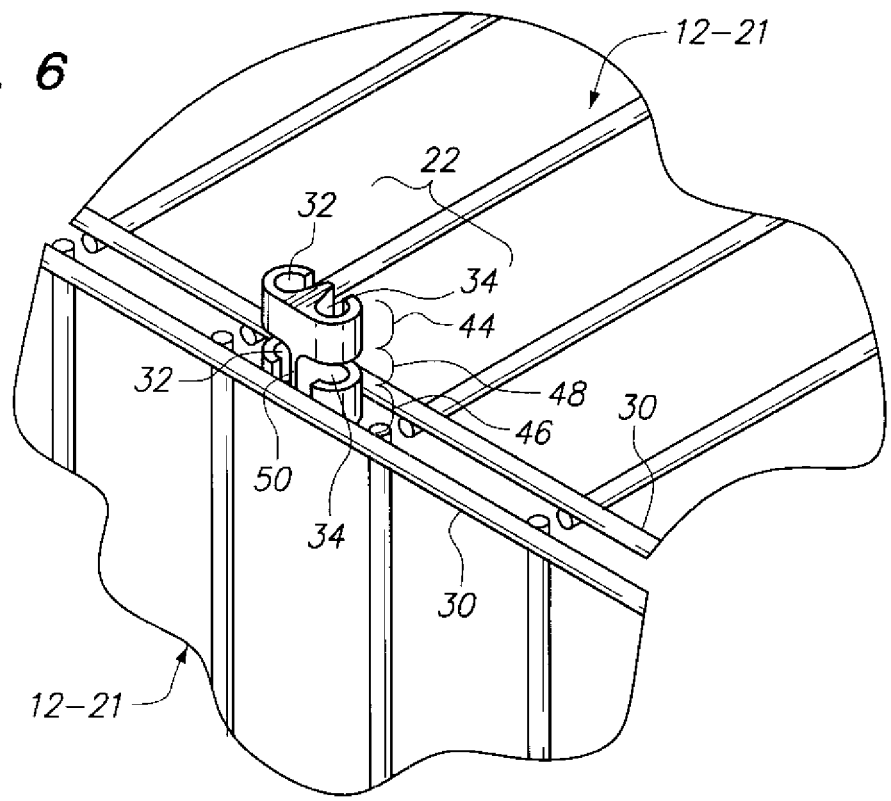
FIG. 6 illustrates a first embodiment of a dual axes swivel connector being inserted between edge rods of adjacent panels.
Figure 7:
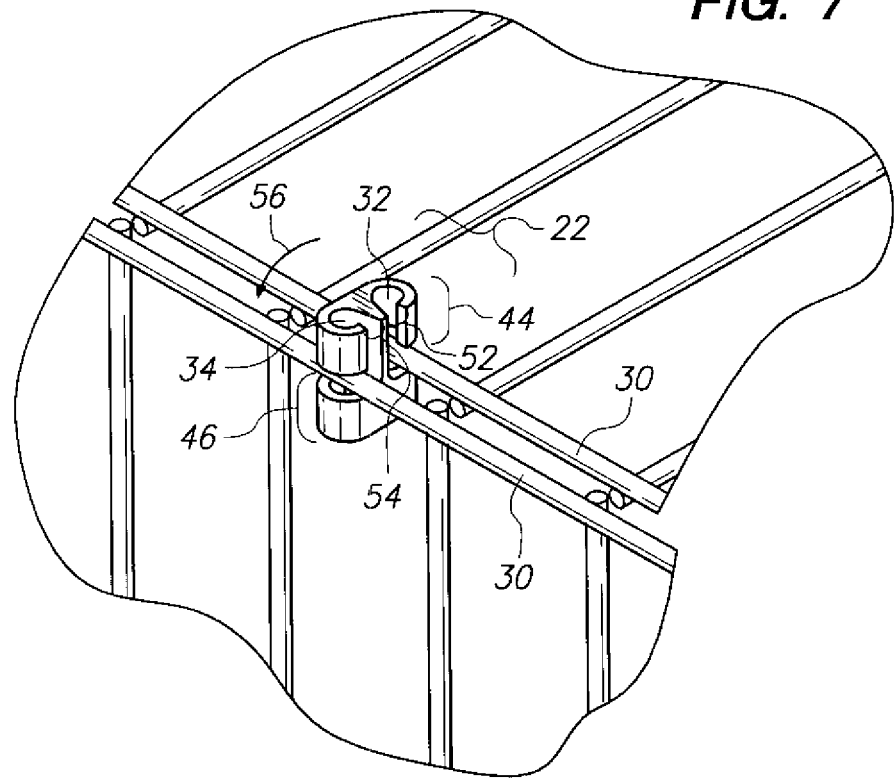
FIG. 7 illustrates edge rods of adjacent panels disposed within a gap of the connector shown in FIG. 6.

Referring now to FIG. 6, the dual axes swivel connector 22 is shown. The dual axes swivel connector 22 may be mounted to adjacent edge rods 30 of adjacent panels 12-21. The connectors 22 may have distal end portions 44, 46 which may be identical but mirror reversed images of each other. In particular, the distal end portion 44 has grooves 32, 34 that are coaxial to grooves 32, 34 of the distal end portion 46. The grooves 32, 34 of the first and second distal end portions 44, 46 may also be parallel with respect to each other. However, the groove openings 52, 54 face opposite directions, as shown in FIGS. 6-8. This is to allow the edge rods 30 of adjacent panels 12-21 to be inserted into the grooves 32, 34 upon rotation of the connector 22.

To install the connector 22 to the edge rods 30, the swivel connector 22 is inserted between adjacent edge rods 30 as shown in FIG. 6. The connector 22 is pushed until the edge rods 30 of adjacent panels 12-21 are aligned to a gap 48 between the first and second distal end portions 44, 46, as shown in FIG. 7. The distal end portions 44, 46 may be attached to each other by a bridge 50 (see FIG. 6). The bridge 50 connects the medians 28 of the first and second distal end portions 44, 46. When the edge rods 30 are aligned to the gap 48, the swivel connector 22 is rotated either in the clockwise or counterclockwise direction, as shown in FIG. 7. In FIG. 7, it is shown that the swivel connector 22 is rotated in the clockwise direction. Grooves 32, 34 of the first and second distal end portions 44, 46 have their openings 52, 54 aligned to the edge rods 30. The swivel connector 22 may now be rotated in the direction of arrow 56 so that the edge rods 30 are forced into the openings 52, 54 of the first and second distal end portions 44, 46 and into the grooves 32, 34 of the first and second distal end portions 44, 46 at the same time. (See FIG. 8). To assist in the insertion of the edge rods 30 into the grooves 32, 34 of the first and second distal end portions 44, 46, the retaining walls 40 may have optional chamfers 58 (see FIG. 9) at a proximal portion adjacent the gap 48. Only one chamfer 58 is identified in FIG. 9, but each of the retaining walls 40 are shown as having the chamfer 58. When the connector 22 is rotated in the direction of arrow 56 (see FIG. 7), the edge rods 30 push against the chamfer 58 and urge the retaining walls 40 outward so that the edge rods 30 can enter the grooves 32, 34. In its final position, the edge rods 30 are disposed within the grooves 32, 34 as shown in FIG. 8. Adjacent panels 12-21 may now be pivoted with respect to each other about two different axes 24, 26 to allow for offsetting of the various panels 12-21 to allow stacking of the various panels 12-21 upon each other and allow for a collapsed configuration of the enclosure 10.

Referring now to FIG. 10, the edge rods 30 are pushed into the grooves 32, 34. The retaining walls 40 are spread open to allow the edge rods 30 to be inserted into the grooves 32, 34. The openings 52, 54 may have a distance smaller than an outer diameter of the edge rods 30. The median 28 may be tapered so that as the edge rods 30 are inserted into the grooves 32, 34, the edge rods 30 are pushed deeper into the grooves 32, 34. Once the edge rods 30 are disposed within the grooves 32, 34, the retaining walls 40 are spring closed over the edge rods 30 to retain the edge rods 30.

Figure 9:
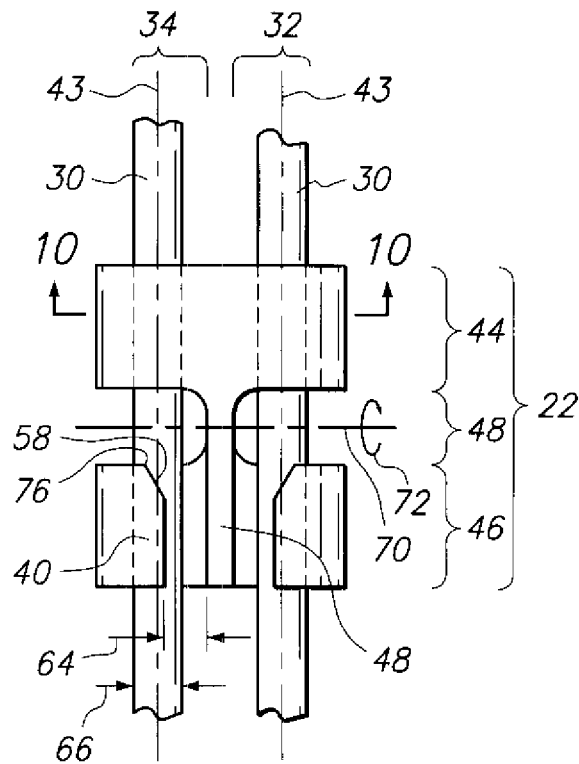
FIG. 9 is a top view of the connector shown in FIG. 8.

Referring now to FIGS. 9 and 10, the connector 22 includes the median 28 which holds the edge rods 30 of adjacent panels 12-21 apart from each other such that the panels 12-21 may rotate about each other without binding. The edge rods 30 of adjacent panels 12-21 generally do not rub against each other so that the adjacent panels 12-21 may rotate freely. A back wall 60 of the connector 22 extends laterally outward from a distal end portion of the median 28. When the edge rods 30 are inserted into the grooves 32 of the connector 22, the tapered median 28 pushes the edge rods 30 deeper into the grooves 32, 34. The back wall 60 limits the insertion of the edge rods 30 beyond the median 28. The retaining walls 40 are attached to opposed distal end portions of the back wall 60 and define the grooves 32, 34. The retaining walls 40 curve around and approach the proximal end portion of the median 28. The space between the distal end portion 38 of the retaining wall 40 and the proximal end portion 62 of the median 28 define the openings 52, 54 of the grooves 32, 34. Preferably, the width 64 (see FIG. 9) is less than a diameter 66 of the edge rods 30. In this manner, once the edge rods 30 are disposed within the grooves 32, 34, the retaining walls 40 retain the edge rods 30 within the grooves 32, 34. Moreover, the distal end portion 38 extends to about a central axis of the edge rods 30. To assemble the enclosure 10, two edge rods 30 are inserted into the grooves 32, 34. The connector 22 is pushed or pulled in the direction of arrow 36 (see FIG. 10) so as to rotate the connector 22 about axis 70 (see FIG. 9) in the rotational direction shown by arrow 72. Both edge rods 30 are inserted or removed from the grooves 32, 34 at the same time. The direction of movement of the connector 22 with respect to the edge rods 30 occurs generally in alignment with arrow 36. If a line 78 is drawn from the center 43 of the edge rods 30 parallel with respect to the direction of arrow 36, the distal end portions 38 of the retaining walls 40 are positioned medially past such line. Preferably, the distal end 74 of the retaining walls 40 is positioned past such line 78. Although the drawings show the distal ends 74 of the retaining walls 40 extending past or medially between the lines 78 drawn from the center 43 of the edge rods 30, it is also contemplated that the distal ends 74 of the retaining walls 40 extend slightly shy of such lines 78. The exact position of the distal ends 74 of the retaining walls 40 may be positioned appropriately to withstand, prevent or mitigate removal of the edge rods 30 from the connector 22 in relation to the flexibility or resiliency of the retaining walls 40. The less resilient the retaining walls 40, the more the distal ends 74 of the retaining walls 40 must extend closer to or past the line emanating from the center 43 of the edge rods 30. Conversely, the more rigid or more resilient the retaining walls 40, the distal ends 74 of the retaining walls 40 may be positioned shy of the line emanating from the center 43 of the edge rods 30.

The line 78 at the intersection of the distal end portion 38 of the retaining wall 40 defines the "bottom portion" of the grooves 32, 34. The grooves 32, 34 of the first and second distal end portions 44, 46 are oriented in opposite directions. As such, the bottom portions of the grooves 32, 34 of the first and second distal portions 44, 46 are also located on opposite sides with respect to each other.

Referring now to FIG. 9, the chamfers 58 assist in spreading open the retaining walls 40 so as to allow receipt of the edge rods 30 into the grooves 32, 34. More particularly, lateral ends 76 of the chamfer 58 may be disposed on lateral sides of the central axis 43 of the edge rods 30. In this manner, as the connector 22 is rotated about axis 70 in the direction of arrow 72 when inserting the edge rods into the grooves 32, 34, the exterior surfaces of the edge rods 30 push against the chamfers 58 to spread open the retaining walls 40 and aid in insertion of the edge rods 30 to the grooves 32, 34. The position of the distal end portions 38 or distal ends 74 of the retaining walls 40 at or about the bottom portion of the grooves 32, 34 as defined above mitigate withdrawal of the rods 30 from the connector 22. As such, the connector 22 may be described or characterized as a unidirectional connector that allows insertion of the rods 30 into the grooves 32, 34 of the connector 22 without mechanical aid and prevents withdrawal of the rods 32, 34 from the connector 22 by hand.

Figure 11:
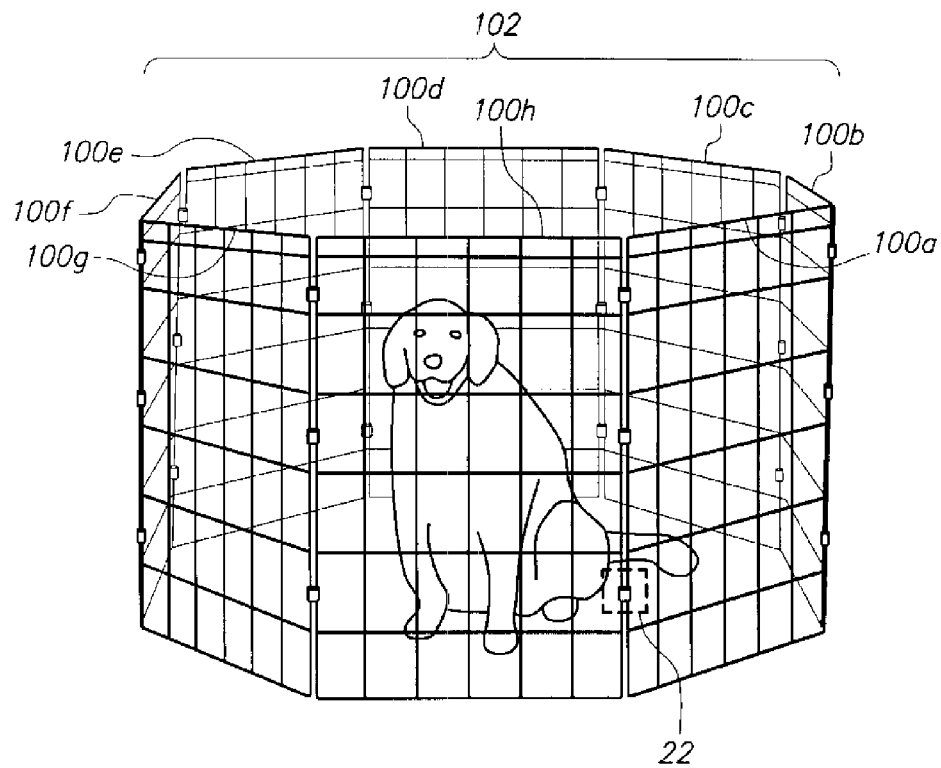
FIG. 11 is a perspective view of a pen having a plurality of wire panels rotatably connected to each other by way of the dual axes swivel connectors.
Figure 11A:
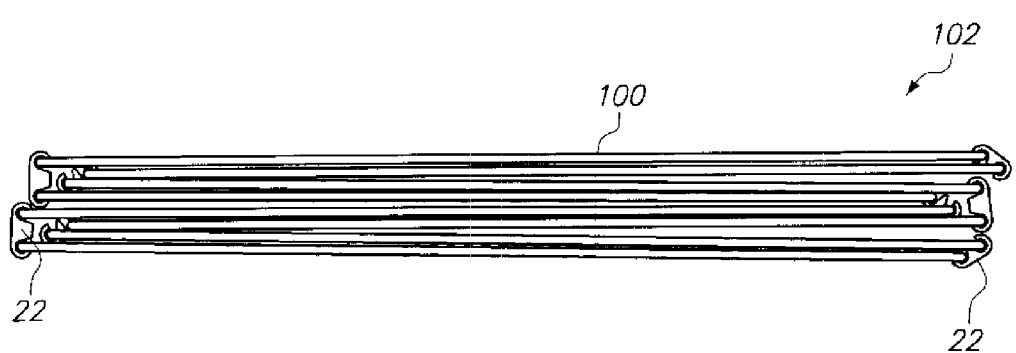
FIG. 11A is a plan view of the pen shown in FIG. 11 in a collapsed configuration.

Referring now to FIG. 11, the connector 22 may be utilized to attach a plurality of wire panels 100a-h for forming a pen 102. Each of the wire panels 100 may be rotatably attached to adjacent wire panels 100a-h. The pen 102 shown in FIG. 11 is shown as having eight wire panels 100a-h. To collapse the pen 102, the wire panels 100a-h may be collapsed upon each other and folded into an accordion configuration as shown in FIG. 11A. As shown in FIG. 11A, the swivel connectors 22 may have varying widths to accommodate the thicknesses of the stacked wire panels 100.

Figure 12:
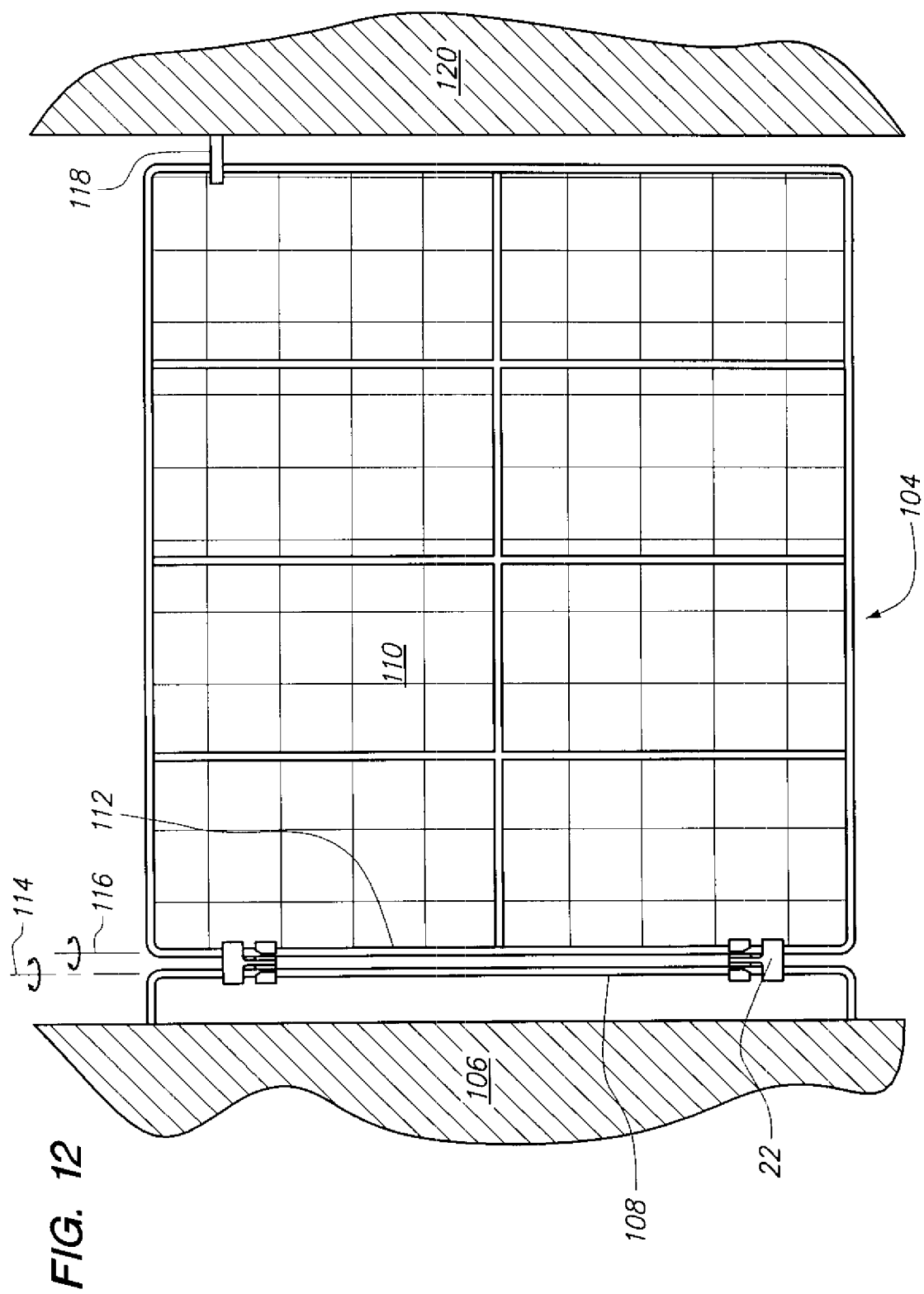
FIG. 12 is a front view of a gate or partition wherein a wire door is rotatably connected to a structure.

Referring now to FIG. 12, the connector 22 may be utilized to provide a hinge for a partition 104 such as in a hallway or stairwell to prevent animals from passing through but allowing people to open and close the partition as desired. In particular, a first side of the partition 104 may be attached to a structural member 106. The partition 104 may include a vertical elongate wire member 108 which receives the connector 22. The elongate wire member 108 is attached to the structural member 106. A wire panel 110 may have a wire edge rod 112 also connected to the connector 22. There may be a sufficient number of swivel connectors 22 so that the wire panel 110 is sturdily held in the upright position. The wire panel 110 may swivel about the wire connectors 22 about pivot axes 114, 116. The wire panel 110 may be opened and closed as desired by a person. The wire panel 110 may be locked in the closed position by latch 118. The latch is mounted to structural member 120. To open the partition 104, the latch 118 is disengaged from the wire panel 110 and the wire panel 110 is pivoted.

The swivel connectors 22 described herein were illustrated in relation to a pet enclosure, a pet pen, and a partition. However, the dual axes swivel connectors 22 may be employed in other types of wire based products and are not limited to those embodiments described herein. The connectors 22 may be utilized in any type of wire based product. By way of example and not limitation, the wire panels or wire based walls need not be fabricated entirely from wire. Rather, the panel or wall may be solid but only the portion of the panel or wall that connects to the connectors 22 may have a cylindrical or wire rod configuration so that the wire rod configuration may be inserted into the first or second grooves of the connectors 22 as needed. The connectors 22 may be utilized in other configurations such as in connecting a plurality of wire rods.

Figure 13:
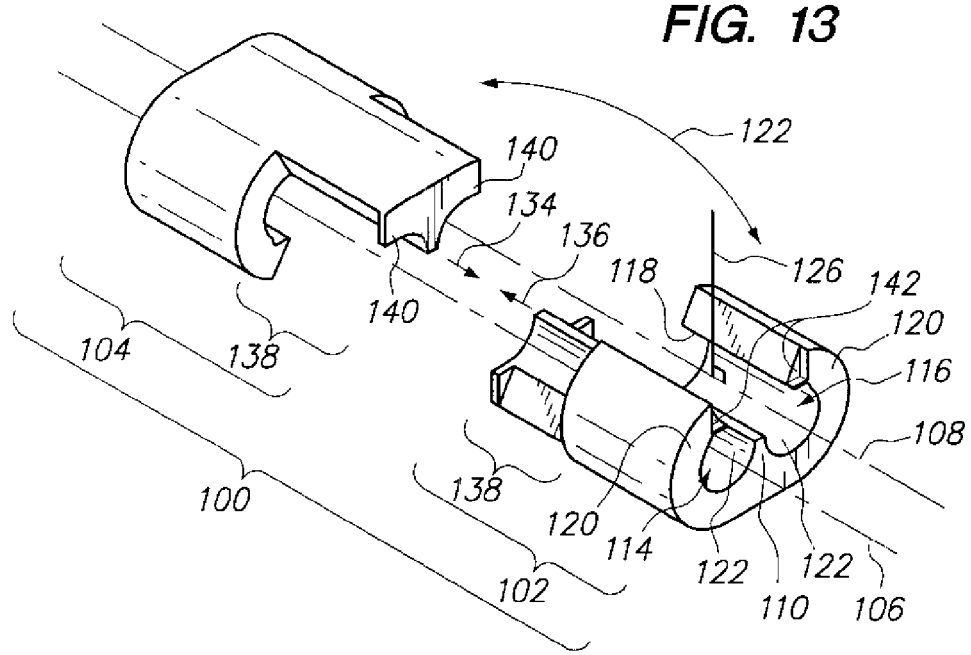
FIG. 13 illustrates a second embodiment of a dual axes swivel connector wherein first and second parts of the second embodiment of the swivel connector mates with each other.

Referring now to FIGS. 13-17, the second embodiment of the dual axes swivel connector 100 is shown. The dual axes swivel connector 100 includes a first clip 102 and a second clip 104. The first and second clips 102, 104 may be identical to each other, but oriented in a reversed orientation as shown in FIG. 13. Alternatively, the first and second clips 102a, 104a may be substantially similar to each other, but have various differences including but not limited to differences in flexibility/strength and shape as shown in FIG. 18. Referring back to FIGS. 13-17, the first and second clips 102, 104 may also be engaged to each other to secure adjacent edge rods 30 of adjacent panel 12, 14, 16, 18, 20, 21 to each other. The second embodiment of the dual axes swivel connector 100 may replace the dual axes swivel connector 22 shown and described in relation to FIGS. 1-12 and provide all of the same benefits described in relation to the first embodiment of the dual axes swivel connector 22 as well as additional benefits described below.

The dual axes swivel connector 100 also has a first pivot axis 106 and a second pivot axis 108. The first and second pivot axes 106, 108 are separated by median 110 so that adjacent edge rods 30 of adjacent panels 12-21 do not contact each other as the adjacent panels 12-21 are rotated about each other. Since the edge rods 30 of the adjacent panels 12-21 do not contact each other, the enclosure 10 does not bind as the enclosure is being traversed from the collapsed position to the erected position and vice versa. Moreover, similar to the first embodiment of the dual axes swivel connector 22, the dual axes swivel connector 100 may be fabricated from a plastic material, whereas the various panels 12, 14, 16, 18, 20 and 21 may be fabricated from a metallic material (e.g., wire rod). The plastic swivel connector 100 functions as a shock absorber reducing noise when the enclosure 10 is being transported in cars, trains, etc. (i.e., vibration induced environments). As will be discussed further below, the swivel connector 100 provides even further pullout resistance than the dual axes swivel connector 22 since only one edge rod 30 fits within an entry 112 (see FIG. 14A) of the clips 102, 104. Additionally, similar to the dual axes swivel connector 22, the dual axes swivel connector 100 also pushes the edge rods 30 deeper into first and second grooves 114, 116 so that a distal edge 118 of retaining walls 120 may be positioned at the center of the edge rods 30 to prevent or mitigate withdrawal from the swivel connector 100. Additionally, the inner surface of the first and second grooves 114, 116 may have a flat surface 128 (see FIG. 14A) to further mitigate withdrawal of the edge rods 30 from the swivel connector 100. Accordingly, the dual axes swivel connector 100 may also be characterized as a unidirectional connector 22.

Referring now to FIG. 13, the first and second clips 102, 104 may be identical to each other. Accordingly, during manufacture of the dual axes swivel connector 100, although there are two clips 102, 104, only one mold or unique configuration is necessary. The first clip 102 may be an identical copy of the second clip 104 except the orientations are reversed for assembly. The first clip 102 is flipped over as shown by arrow 122 in relation to the second clip 104. The median 110 may have an inner surface 122 (see FIG. 14A) which is curved that urges the edge rods 30 deeper into the grooves 114, 116 and also have a semi-circular configuration as shown in FIG. 14A. The curved inner surfaces 122 may be characterized as having an inverted V shape configuration or tapered shape. The retaining walls 120 wrap around the edge rods 30 to retain the edge rods 30 within the grooves 114, 116. The retaining walls 120 preferably extend around the edge rods 30 until the distal edges 118 are aligned to a center 43 of the edge rods 30 when the edge rods 30 are disposed within the first and second grooves 114, 116. The first and second grooves 114, 116 are generally parallel to each other as shown in FIG. 13. The axes 106, 108 of the first and second grooves 114, 116 may be in the same plane 132. The distal edge 118 may still be characterized as being aligned to the respective axes 106, 108 when the distal edge 128 is aligned to the respective axes 106, 108 when a line 126 perpendicular to the plane defined by the axes 106, 108 intersects the distal edge 118. The distal edge 118 may be slightly shy of the line 126 as shown in solid lines in FIG. 14A or past the line 126 as shown in dash lines. Nonetheless, the distal edge 118 may still be characterized as being aligned to the respective axes 106, 108. In FIG. 13, line 126 is shown for axis 108, but not shown for axis 106 for purposes of clarity. However, in FIG. 14A, line 126 for both axes 106, 108 for the first and second grooves 114, 116 are shown.

An inner surface 130 of the retaining walls 120 may have a generally circular configuration which conforms to the inner surface 122 of the median 110. As the inner surfaces 130 of the retaining walls 120 approach the distal edge 118, the inner surface 130 may jog upward and have a flat surface 128. The flat surface 128 may be parallel to the plane 132 defined by axes 106, 108. The flat surface 128 provides for more pullout resistance so that the edge rods 30 are less likely to be pulled out of the grooves 106, 108 after assembly. The reason is that the edge rod 30 applies a force 133 on the flat surface 128 of the retaining wall 120 that is generally normal to the plane 132. Since the surface 128 is flat and parallel to the plane 132 and perpendicular to the line 126, the edge rod 30 produces or applies a force 133 that is generally parallel to the line 126 on the flat surface 128 instead of a force 135 that tends to spread open the retaining walls 120. If the flat surface 128 were to be circular and conformed to the circular configuration of the inner surfaces 130, 122 then the edge rod would apply a force that is generally skewed with respect to the plane 132 so as to be likely to spread the retaining wall open compared to the generally normal force 133 discussed above.

Figure 14:
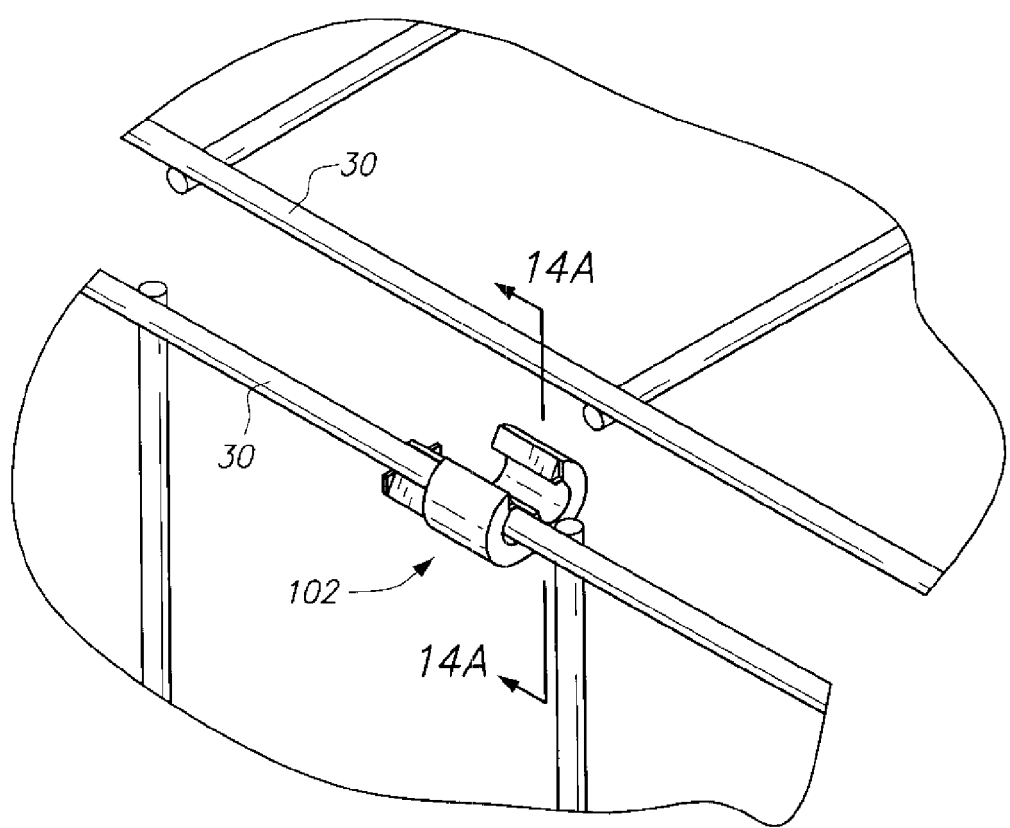
FIG. 14 illustrates a first part of the second embodiment of the connector shown in FIG. 13 wherein an edge rod of an adjacent panel is inserted into a groove of the first part of the second embodiment of the connector.
Figure 14A:
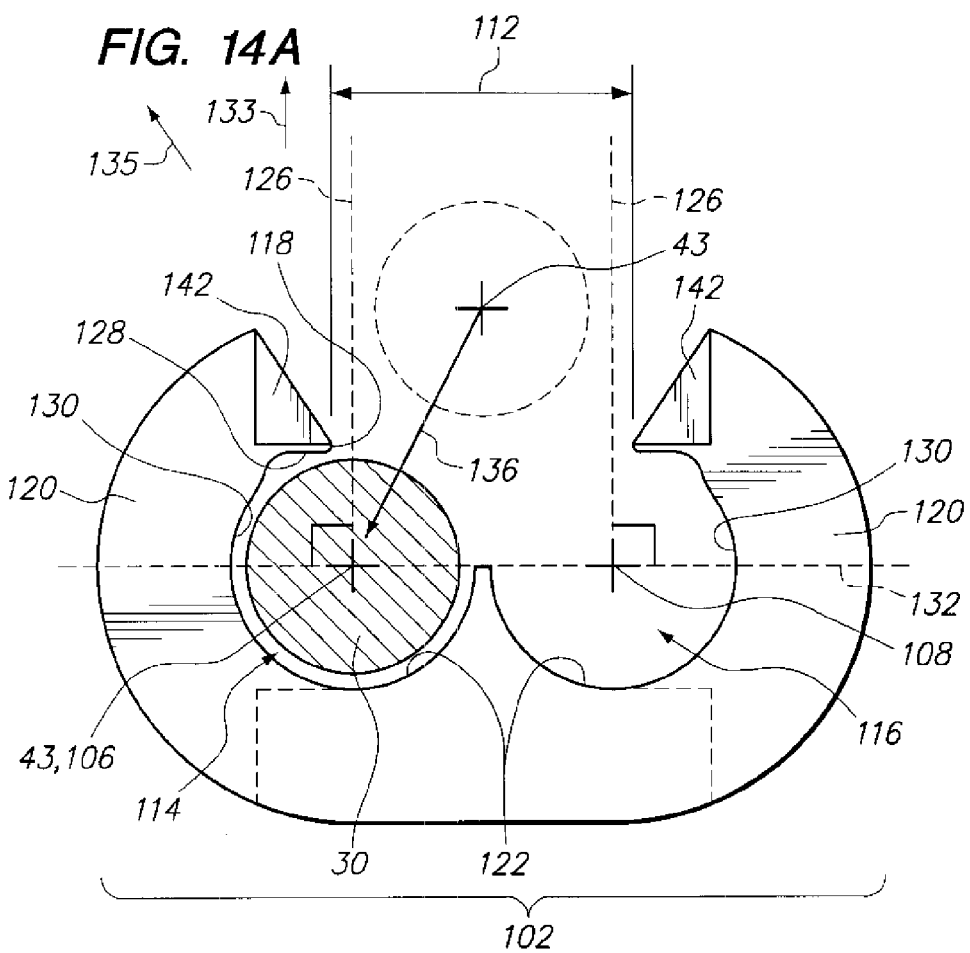
FIG. 14A is a side view of the first part of the second embodiment of the connector shown in FIG. 14.
Figure 15:
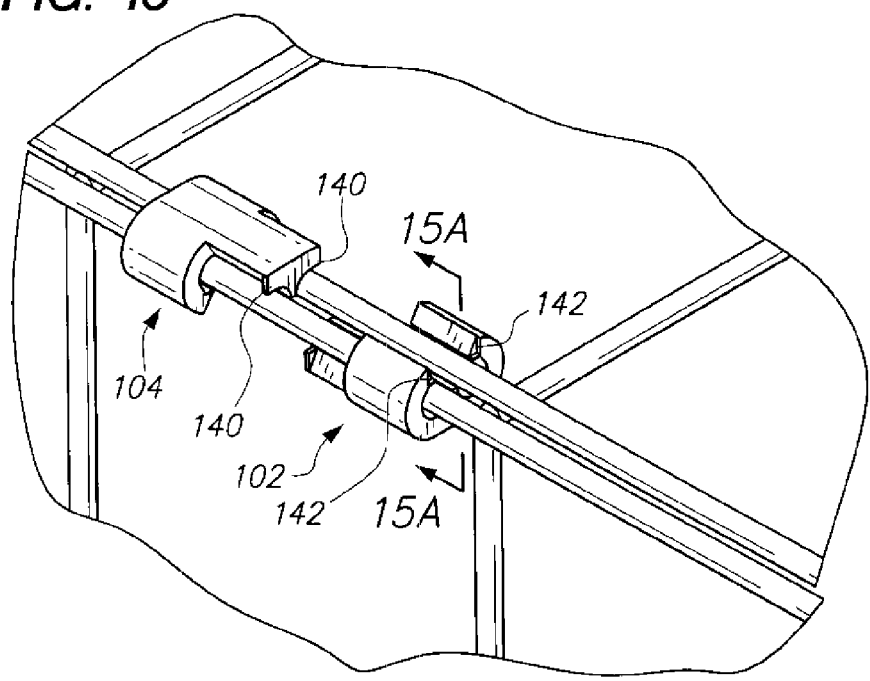
FIG. 15 illustrates edge rods of adjacent panels fitted within grooves of first and second parts of the second embodiment of the connector.
Figure 15A:
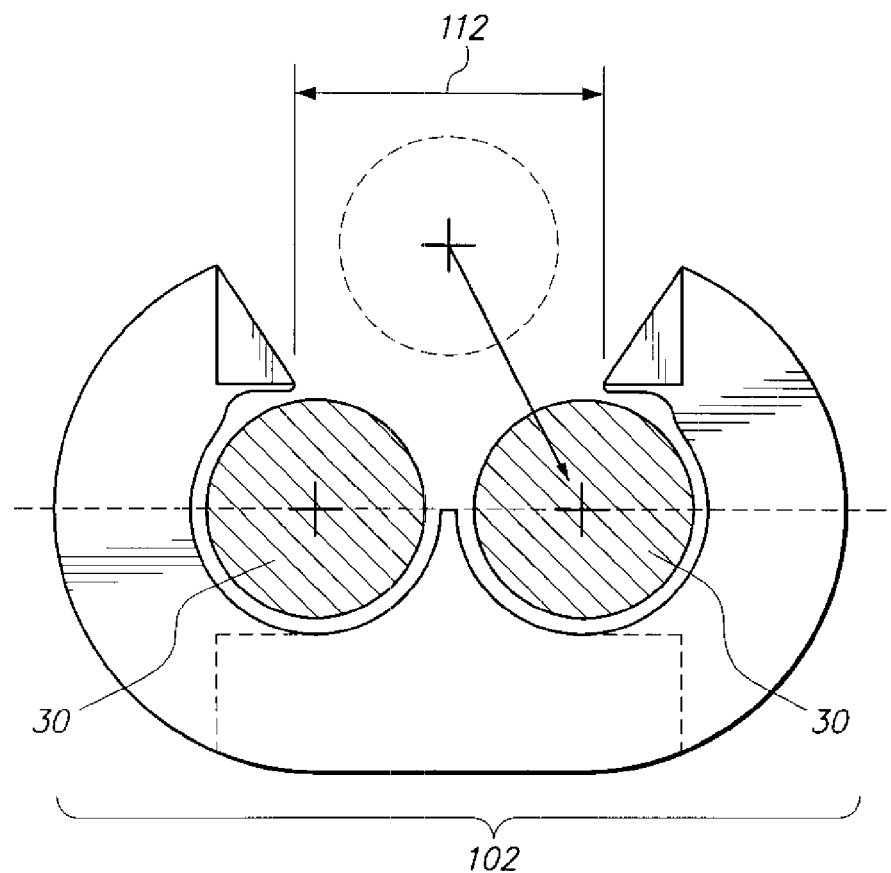
FIG. 15A is a side view of the first part of the second embodiment of the connector shown in FIG. 15.
Figure 16:
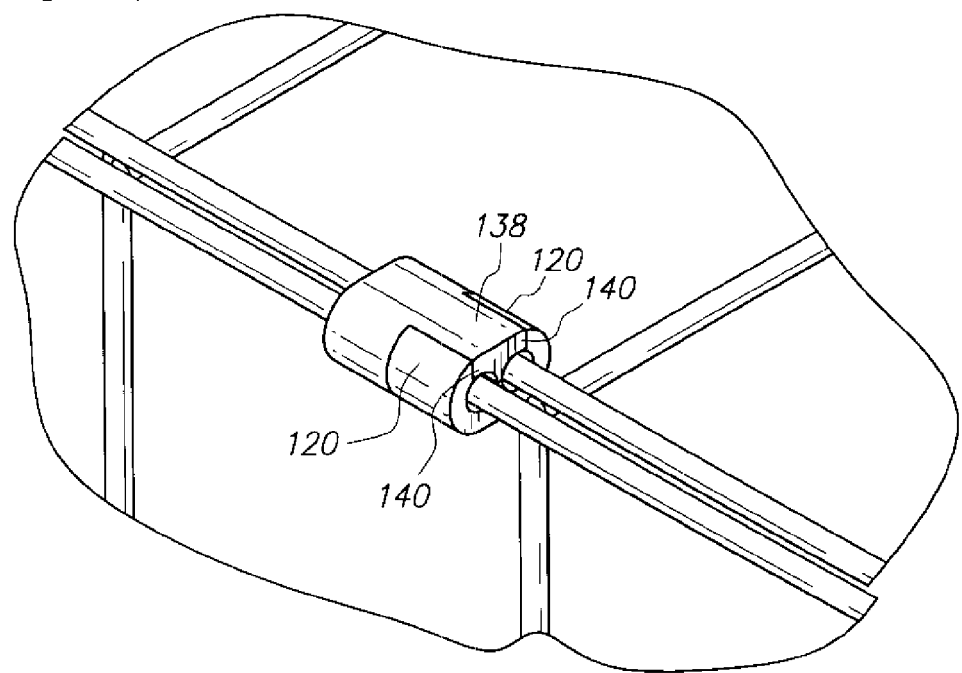
FIG. 16 illustrates the first and second parts of the second embodiment of the connector when engaged to each other.

To attach adjacent edge rods 30 of adjacent panels 12-21 to each other, one of the edge rods 30 as shown in FIG. 14 is inserted into one of the grooves 106, 108 of the first part 102. Thereafter, the other edge rod 30 of the other panel 12-21 is inserted into the other one of the grooves 106, 108 of the first part 102. Thereafter, the second part is secured to the adjacent edge rods 30 of the adjacent panels 12-21 one by one, not simultaneously, as shown in FIG. 15. At this point, both the first and second parts 102, 104 of the connector 100 are secured to adjacent edge rods 30 of adjacent panels 12-21, but are not engaged to each other. If the part 102 is twisted to remove the rods 30 from the first and second grooves 114, 116, then both rods 30 would be forced through the entry 112 simultaneously. Due to the rigidity of the retaining walls 120, both rods 30 could not come out of the entry 112 at the same time. To further add rigidity to the system, the first and second parts 102, 104 are engaged to each other. To this end, the first and second parts 102, 104 are pushed toward each other as shown by arrows 134, 136 in FIG. 13. Extensions 138 of the first and second parts 102, 104 are disposed between the retaining walls 120 of the second and first parts 104, 102. To do so, the extensions 138 must be lifted up slightly so that pawls 140 which engages recesses 142 of the other parts 102, 104 can clear the retaining walls 120 of the other part 102, 104. The first and second parts 102, 104 are slid together until the pawls 140 snaps into place in the recesses 142, as shown in FIG. 16. A plurality of connectors 100 are fitted onto the adjacent edge rods 30 to allow the panels 12-21 to swivel or pivot with respect to each other and yet be strong enough to withstand stress from the animal and outside forces. The swivel connector 100 allows an operator to collapse the enclosure 10 and provides all of the other benefits described above in relation to the other embodiments of the connector.

As discussed above, the first and second parts 102, 104 have pawls 140 which engage recesses 142 (see FIG. 13) to lock the first and second parts together (see FIG. 16). The pawls 140 are formed on the distal end of the extension 138. The recesses 142 are formed on the proximal side of the retaining walls 120 (see FIG. 16). The pawls 140 are shown as being received into the recesses 142 so that the pawls 140 do not protrude out of the retaining walls 120. Rather, the pawls 140 are flush with the retaining walls 120. However, it is also contemplated that no recesses 142 are formed in the retaining walls. In this instance, the pawls 140 extend over the proximal side of the retaining walls 120 and are not flush therewith.

The first and second clips 102, 104 discussed above were described as being identical to each other. However, it is also contemplated that the first and second clips 102, 104 may not be identical to each other. By way of example and not limitation, one of the first and second clips 102, 104 may have recesses 142 and no pawls 140, whereas the other one has pawls 140 and no recesses 142. In another example, neither of the first and second clips 102, 104 have recesses but only one of the first and second clips 102, 104 has pawls that extend over the retaining walls of the of the other one of the first and second clips 102, 104. Additionally, the first and second parts 102a, 104a may be fabricated from materials having different hardnesses and flexibility. By way of example and not limitation, the first clip 102a may be fabricated from a harder material (e.g., BK30) compared to the material from which the second clip 102b is fabricated (e.g., Polypropylene 667A). Moreover, as shown in FIG. 18, the width 144 of the median 110a may be narrower compared to the width 146 of the median 110b. Additionally, the inner surface 130 may have grooves 148 to strengthen the structure of clip 102b/ retaining wall 120 and also to provide for a reverse hook design which helps in holding or locking the wire rods 30 securely in the first and second grooves 114, 116. Moreover, the retaining walls 120 extend closer to each other and provide for a smaller gap 112a compared to the gap 112b of the first clip 102a. During installation, the first clip 102a may be attached to the wire rods 30 first. The first clip 102a may be more rigid but has a looser fit with the wire rods 30 than the second clip 104a to allow the wire rods 30 to enter into entry 112b of the first clip 102a and into the grooves 114, 116 of the first clip 102a. Thereafter, the second clip 104a may be attached to the wire rods 30. The second clip 104a has a tighter tolerance or fit with the wire rods 30 compared to the first clip 102. However, as discussed above, the second clip 104a is fabricated from a material which is more flexible than the material from which the first clip 102a is fabricated and flexible enough to allow the retaining walls 120 of the first clip 102a to flex so that the wire rods 30 can be inserted into the entry 112a and the grooves 114, 116. The flex of the second clip 104a allows the retaining walls 120 to bend and allow the wire rods 30 to be urged into the grooves 114, 116. The second clip 104a can be interlocked with the first clip 102a as discussed extensively above. The tight fit of the second clip 104a to the wire rods provides for smooth pivoting action from the connector (i.e., first and second clips). The rigidity of the first clip 102a adds strength to the connector. The first and second clips 102a, 104a provides for a secure connection. The first and second clips 102a, 104a may also have all the features discussed above in relation to first and second parts 102, 104.

Figure 17:
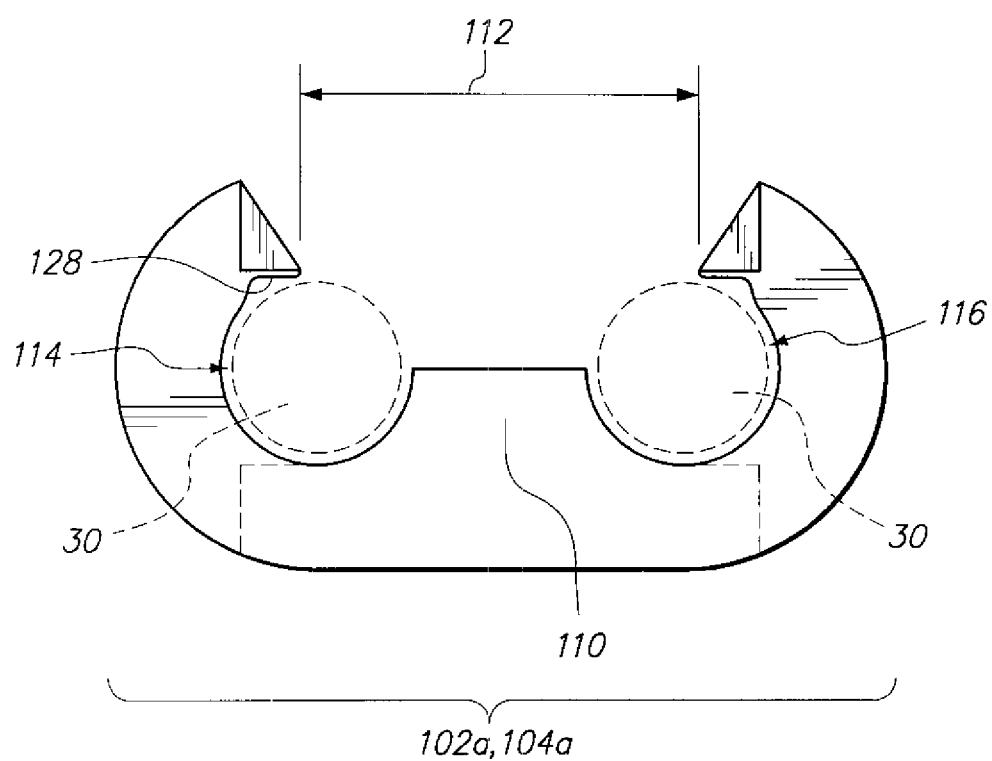
FIG. 17 illustrates a variation of the second embodiment of the swivel connector with a widened median.
Figure 18:
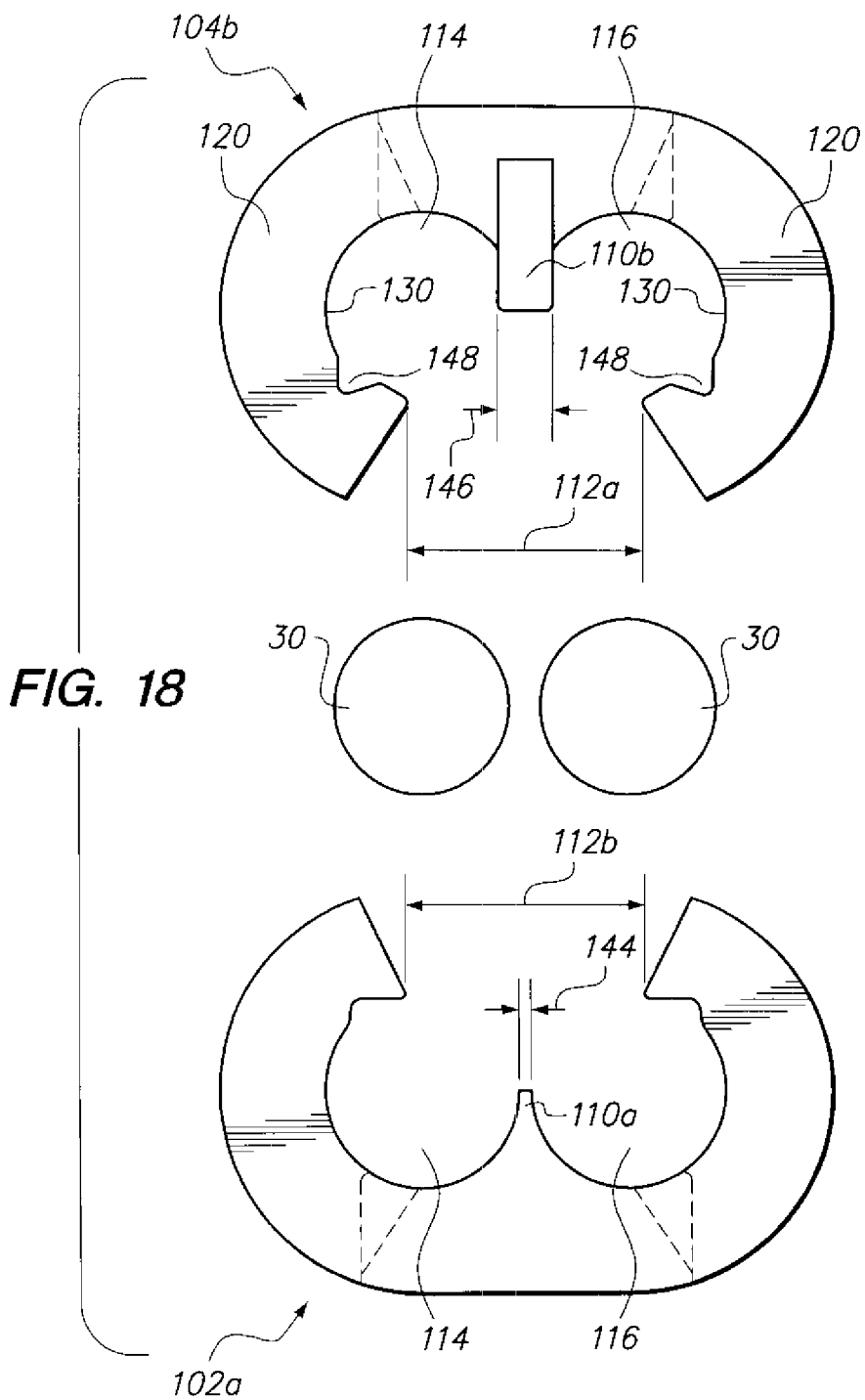
FIG. 18 illustrates another embodiment of the swivel connector.

Referring now to FIG. 17, a side view of a variation of the first and second parts 102, 104 of the second embodiment of the swivel connector 100 is shown. In this variant of the second embodiment, the inner surfaces of the first and second grooves 114, 116 may still have flat surfaces 128 to mitigate withdrawal of the edge rods 30 from the first and second parts 102, 104. However, the median 110 may be wider for disposing the adjacent edge rods 30 further apart from each other compared to the edge rods 30 disposed within the first and second parts 102, 104 as shown and described in relation to FIGS. 13-16. Also, entry 112 is wider than two diameters of the edge rod 30.

The above description is given by way of example, and not limitation. Given the above disclosure, one skilled in the art could devise variations that are within the scope and spirit of the invention disclosed herein, including various ways of pivoting the connectors 22 to allow offset of the various panels. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A dual axes swivel connector for pivotally connecting adjacent first and second panels, the first panel having a first rod, the second panel having a second rod, the connector comprising:
    a first part having first and second grooves wherein the first groove is operative to receive the first rod and the second groove is operative to receive the second rod, the first part comprises:
        a tapered median for directing the first and second rods into the grooves of the first part and away from each other; and
        first and second retaining walls which extend from the tapered median and wrap around the first and second rods defining the first and second grooves of the first part;
    a second part having first and second grooves wherein the first groove is operative to receive the first rod and the second groove is operative to receive the second rod, the second part comprises:
        a tapered median for directing the first and second rods into the grooves of the second part and away from each other; and
        first and second retaining walls which extend from the tapered median and wrap around the first and second rods defining the first and second grooves of the second part;
    wherein the first part is fabricated from a more rigid material and has a looser fit compared to the second part so that the first part provides strength to the connector and the second part provides smooth pivoting action to the connector.

2. The connector of claim 1 wherein the tapered median of the first part is narrower compared to the tapered median of the second part.

3. The connector of claim 1 wherein distal ends of the retaining walls of the first part define an entry of the first part and distal ends of the retaining walls of the second part define an entry of the second part, and the entry of the first part is wider compared to the entry of the second part.

4. The connector of claim 1 wherein the first and second parts each further comprise an extension that protrudes out from the tapered median parallel to longitudinal axes of the first and second grooves, the longitudinal axes of the first and second grooves being parallel to each other, and the extension of the first part is disposable between the distal ends of the first and second retaining walls of the second part and the extension of the second part is disposable between the distal ends of the first and second retaining walls of the first part for interlocking the first and second parts.

5. The connector of claim 1 wherein distal end portions of the first and second retaining walls of the first part and second part have a V shaped configuration for guiding the wire rod into the entry.

* * * * *